United States Patent
Chen et al.

(10) Patent No.: US 7,999,528 B2
(45) Date of Patent: Aug. 16, 2011

(54) DUAL MODE TRANSIENT RECOVERY CONTROL METHOD OF DC-DC CONVERTERS

(75) Inventors: Yi-Jan Emery Chen, Taipei (TW); Pang-Jung Liu, Taipei (TW)

(73) Assignee: National Taiwan University, Taipei (TW)

( * ) Notice: Subject to any disclaimer, the term of this patent is extended or adjusted under 35 U.S.C. 154(b) by 268 days.

(21) Appl. No.: 12/353,335

(22) Filed: Jan. 14, 2009

(65) Prior Publication Data

US 2009/0309561 A1 Dec. 17, 2009

(30) Foreign Application Priority Data

Jun. 17, 2008 (TW) ................. 97122490 A

(51) Int. Cl.
*G05F 1/40* (2006.01)
*H02H 7/10* (2006.01)

(52) U.S. Cl. ......................... 323/284; 363/50

(58) Field of Classification Search .......... 323/222–226, 323/268, 271, 282, 284, 285; 363/39, 50
See application file for complete search history.

(56) References Cited

U.S. PATENT DOCUMENTS

| 6,362,607 B1 * | 3/2002 | Wickersham et al. | 323/272 |
| 6,621,256 B2 * | 9/2003 | Muratov et al. | 323/282 |
| 6,922,044 B2 * | 7/2005 | Walters et al. | 323/288 |

* cited by examiner

*Primary Examiner* — Matthew V Nguyen
(74) *Attorney, Agent, or Firm* — Peter F. Corless; Steven M. Jensen; Edwards Angell Palmer & Dodge LLP

(57) ABSTRACT

A dual mode transient recovery control method and system is proposed, which is designed for use with a direct-current (DC) power output unit, such as a DC-DC converter, for fast transient recovery of DC output power by switching the DC-DC converter to operate between a hysteretic mode and a PWM (Pulse Width Modulation) mode. The proposed control method and system is characterized by the use of a dual-threshold scheme to compare the output voltage. This feature may discharge the transient output voltage, raised by the over-shoot, to the steady state by switching to the discharging mode, and similarly charge the transient output voltage, dropped by the under-shoot, to the steady state by switching to the charging mode. This mechanism may allow DC-DC converters with higher slew rate to make transient ripples of output voltage to return to steady state more quickly, and additionally allow a better level of noise immunity.

19 Claims, 4 Drawing Sheets

DUAL MODE TRANSIENT RECOVERY CONTROL METHOD OF DC-DC CONVERTERS

BACKGROUND OF THE INVENTION

1. Field of the Invention

This invention relates to electronic circuit technology, and more particularly, to a dual mode transient recovery control method and system for fast transient recovery of the output of a DC (direct current) power output device, such as DC-DC converters.

2. Description of Related Art

DC-DC converters are an electronic circuit component that is nowadays widely used in many types of computer units and intelligent electronic devices. In operation, a DC-DC converter is capable of converting an input DC voltage having a higher amplitude (such as battery-supplied voltage) to an output DC voltage having a lower amplitude, such that the down-converted DC voltage is used to drive low-voltage IC (integrated circuit) chips, such as microprocessors, memory modules, digital signal processing chips, to name just a few. Nowadays, the present IC technology allows IC chips to operate with a system voltage as low as 0.8 V with a current of 200 A.

In practical applications, however, the operation of modern IC chips may provide serious load current variation in range of 20A to 200A due to the complexity thereof. Such serious load current variation may cause much serious output voltage transient response, such as over-shoot and under-shoot, to make the output voltage substantially deviating from the steady state value, which the output voltage should achieve. The output voltage may be provided with larger difference between the steady state value and the transient response by this deviation, thereby slowing down the transient response recovery.

One solution to the aforementioned problem is to employ a large decoupling capacitor that allows transient ripples to return to steady state more quickly. In practice, however, the solution with the large decoupling capacitor has two drawbacks: firstly, it is costly in price to purchase and thus would increase the overall manufacture cost of DC-DC converters; and secondly, due to the bulky size of the large capacitor, it would require a large circuit layout area for implementation of the DC-DC converters.

One solution to the aforementioned problem has been disclosed in U.S. Pat. No. 6,621,256 entitled "DC to DC converter method and circuitry". This patent teaches a dual-mode switching control method which switches the DC-DC converter to operate in PWM mode under the condition of a heavy loading, and to operate in hysteretic mode under the condition of a light loading. Moreover, the performance of this dual-mode switching control method would be influenced by an internal inductance current, in such a manner that in PWM mode, it would exhibit a smaller ripple amplitude but a slower response; whereas in hysteretic mode, it would exhibit a faster response but a relatively larger ripple amplitude. This patent, however, is unable to solve the aforementioned problem.

SUMMARY OF THE INVENTION

It is therefore an objective of this invention to provide a new technology that allows the fast transient recovery of DC-DC converters. In architecture, the dual mode transient recovery control system of the invention comprises: (A) a hysteretic mode control module; (B) a PWM mode control module; (C) a control signal generation module; and (D) a mode switching control module.

The dual mode transient recovery control method and system according to the invention is characterized by the use of a dual-threshold scheme to compare the actually received output voltage values on the loading terminals of DC-DC converters, i.e., a total of 4 threshold levels including a negative-ripple falling-edge threshold and a negative-ripple rising-edge threshold on the negative polarity of the DC output amplitude, and a positive-ripple rising-edge threshold and a positive-ripple falling-edge threshold on the positive polarity of the same, where the negative-ripple rising-edge threshold is higher in level than the negative-ripple falling-edge threshold, while the positive-ripple falling-edge threshold is lower than the positive-ripple rising-edge threshold. During operation, the DC output amplitude is continuously detected and compared against these 4 thresholds for triggering the switching operation between the hysteretic mode and the PWM mode. This feature may discharge the transient output voltage, raised by the over-shoot, to the steady state by switching to the discharging mode, and similarly charge the transient output voltage, dropped by the under-shoot, to the steady state by switching to the charging mode. This mechanism may allow DC-DC converters with higher slew rate to make transient ripples of output voltage to return to steady state more quickly, and additionally allow a better level of noise immunity.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The dual mode transient recovery control method and system according to the invention is disclosed in full details by way of preferred embodiments in the following with reference to the accompanying drawings.

Figure 1:
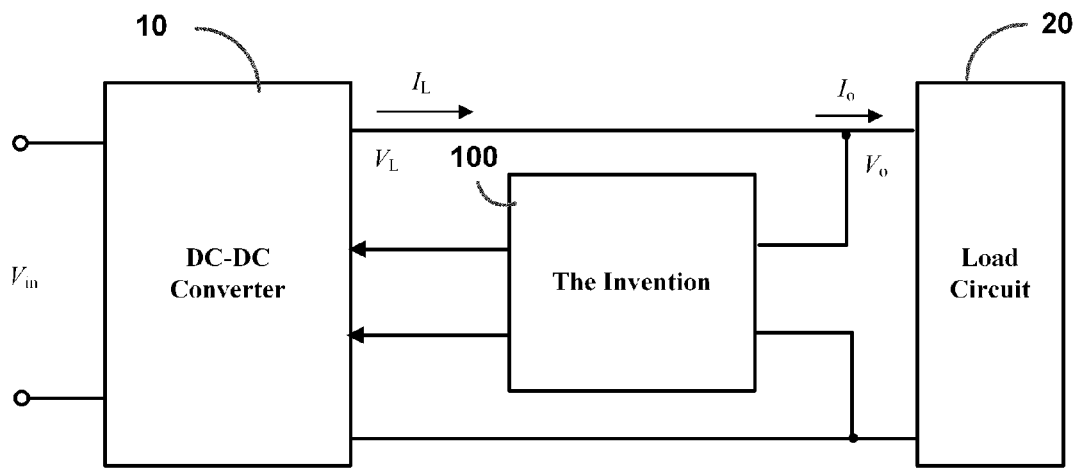
FIG. 1 is a schematic diagram showing an application of the dual-mode transient recovery control system of the invention.

FIG. 1 is a schematic diagram showing an application of the dual mode transient recovery control system of the invention (which is here encapsulated in a box indicated by the reference numeral 100 and will be hereinafter referred to in short as "dual-mode transient recovery control system"). As shown, the dual-mode transient recovery control system of the invention 100 is designed for integration to a DC power output unit (such as a DC-DC converter 10) and a load circuit 20. The DC-DC converter 10 is used for converting an input DC voltage $V_{in}$ in a DC-to-DC manner to thereby produce an output DC load voltage $V_o$ and an DC output load current $I_o$ for the load circuit 20 (the actual load voltage and current received by the load circuit 20 are denoted by $V_o$ and $I_o$ respectively).

Figure 2:
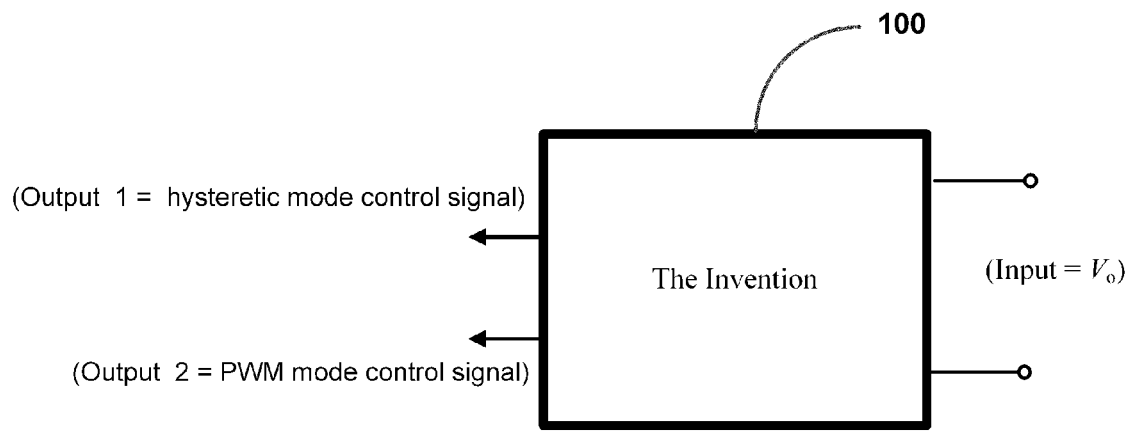
FIG. 2 is a schematic diagram showing the I/O functional model of the dual-mode transient recovery control system of the invention.

FIG. 2 is a schematic diagram showing the input/output (I/O) functional model of the dual-mode transient recovery control system of the invention 100. As shown, the dual-mode transient recovery control system of the invention 100 is capable of performing a dual-mode transient recovery control operation on the DC-DC converter 10 for fast transient recovery of the output load current $I_L$ in response to $V_o$. More specifically, the dual-mode transient recovery control system of the invention 100 is capable of outputting a hysteretic mode control signal and a PWM mode control signal in a switched manner to the DC-DC converter 10 in response to the actual load voltage $V_o$ received by the load circuit 20. This dual-mode switching action allows the DC-DC converter 10 to operate in hysteretic mode and PWM mode in a switched manner based on the magnitude of $V_o$.

Figure 4:
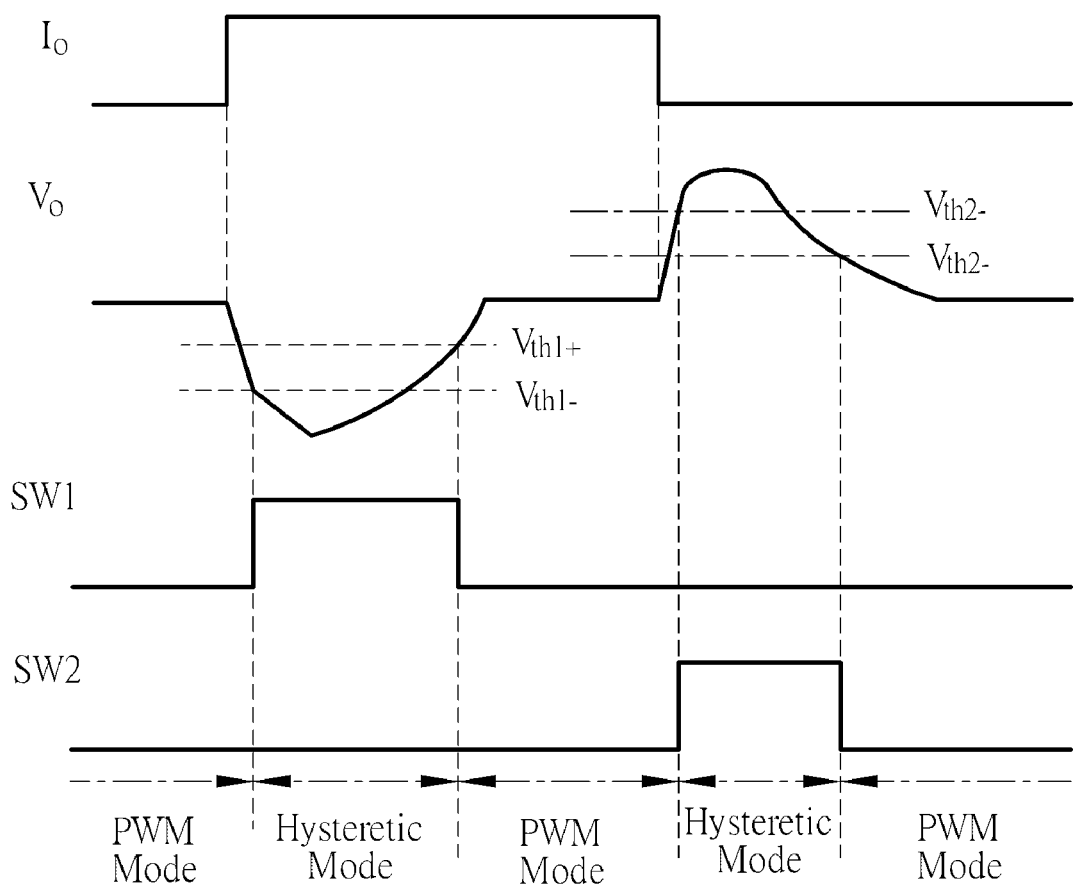
FIG. 4 is a signal diagram showing the waveform and sequencing of the switching control signals (SW1, SW2) in relation to the load voltage and current ($V_o$, $I_o$)

As depicted in FIG. 4, when $V_o$ exhibits a transient ripple on under-shoot or over-shoot, the DC-DC converter 10 is switched to operate in hysteretic mode; and when $V_o$ returns to steady state, the DC-DC converter 10 is switched to operate in PWM mode. This dual mode switching operation allows the DC output power of the DC-DC converter 10 to have the operating characteristic of fast transient recovery.

Figure 3:
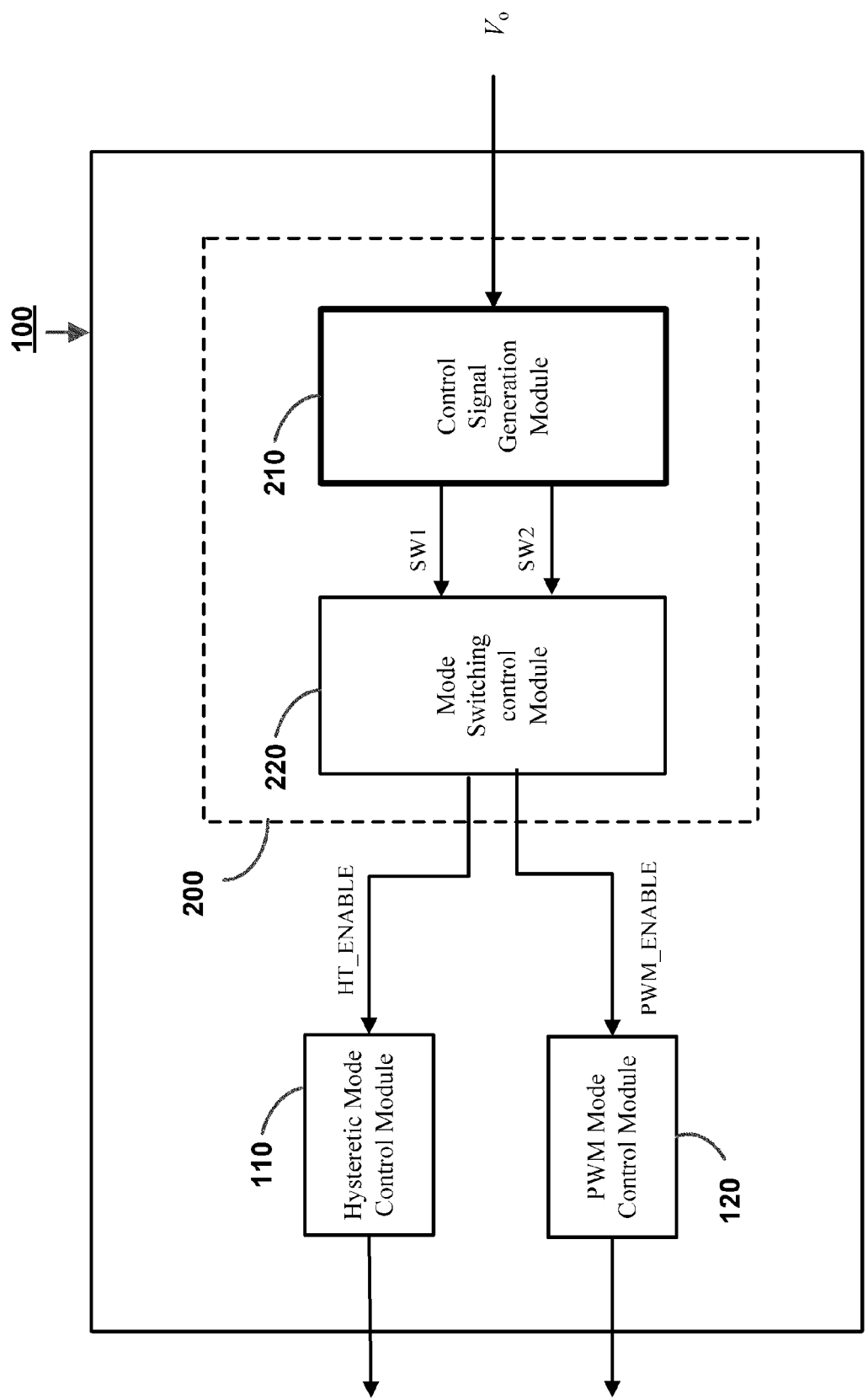
FIG. 3 is a schematic diagram showing the architecture of the dual-mode transient recovery control system of the invention.

As shown in FIG. 3, in circuit architecture, the dual-mode transient recovery control system of the invention 100 comprises: (A) a hysteretic mode control module 110; (B) a PWM mode control module 120; (C) a control signal generation module 210; and (D) a mode switching control module 220. In this architecture, the control signal generation module 210 and the mode switching control module 220 in combination constitute a dual-mode switching control circuit 200. Firstly, the respective attributes and functions of these constituent components of the invention are described in details in the following.

The hysteretic mode control module 110 is capable of providing a hysteretic mode control function by generating a hysteretic mode control signal for the DC-DC converter 10. Since the hysteretic mode control operation is a conventional technique, detailed description thereof will not be given in this specification.

The pulse-width modulation (PWM) mode operating module is capable of providing a PWM mode control function by generating a PWM mode control signal for the DC-DC converter 10. Since the PWM mode control operation is a conventional technique, detailed description thereof will not be given in this specification.

The control signal generation module 210 is capable of continuously detecting the magnitude of the actual output voltage $V_o$ received by the load circuit 20 for comparison based on a dual-threshold scheme against a pair of preset threshold levels on each polarity of the amplitude of $V_o$, i.e., a total of 4 threshold levels $[(V_{th1-}, V_{th1+}), (V_{th2+}, V_{th2-})]$, including a negative-ripple falling-edge threshold ($V_{th1-}$) and a negative-ripple rising-edge threshold ($V_{th1+}$) on the negative polarity of $V_o$, and a positive-ripple rising-edge threshold ($V_{th2+}$) and a positive-ripple falling-edge threshold ($V_{th2-}$) on the positive polarity of $V_o$, to thereby generate a set of mode switching control signals (SW1, SW2). As illustrated in FIG. 4, the negative-ripple rising-edge threshold ($V_{th1+}$) is higher in level than the negative-ripple falling-edge threshold ($V_{th1-}$), while the positive-ripple falling-edge threshold ($V_{th2-}$) is lower than the positive-ripple rising-edge threshold ($V_{th2+}$).

FIG. 4 is a signal diagram showing the waveform and sequencing of the switching control signals (SW1, SW2) in relation to the load voltage and current ($V_o$, $I_o$) based on the comparison of the amplitude of $V_o$ against the 4 threshold levels $[(V_{th1-}, V_{th1+}), (V_{th2+}, V_{th2-})]$.

As shown, in the event that $V_o$ exhibits a negative ripple, when the magnitude of $V_o$ reaches down below the negative-ripple falling-edge threshold ($V_{th1-}$), SW1 is switched to logic-HIGH state while SW2 is switched to logic-LOW state. Subsequently, when $V_o$ bounces back from the negative extreme and reaches at $V_{th1-}$, SW1 still remains unchanged at logic-HIGH state and waits until $V_o$ further reaches up above the negative-ripple rising-edge threshold ($V_{th1+}$) to be switched back to logic-LOW state. During this period, SW2 constantly remains unchanged at logic-LOW state.

On the other hand, in the event that $V_o$ exhibits a over-shoot, when the magnitude of $V_o$ reaches up above the positive-ripple rising-edge threshold ($V_{th2+}$), SW2 is switched to logic-HIGH state while SW1 is switched to logic-LOW state. Subsequently, when $V_o$ bounces back from the positive extreme and reaches at $V_{th2+}$, SW2 still remains unchanged at logic-HIGH state and waits until $V_o$ further reaches down below the positive-ripple falling-edge threshold ($V_{th2-}$) to be switched back to logic-LOW state. During this period, SW1 constantly remains unchanged at logic-LOW state.

In practice, the dual-threshold comparison operations can be implemented with either analog comparator circuitry or digital comparator circuitry.

The mode switching control module 220 is capable of responding to the mode switching control signals (SW1, SW2) for generating a hysteretic mode enable signal HT_ENABLE or a PWM mode enable signal PWM_ENABLE in a switched manner; where the hysteretic mode enable signal HT_ENABLE is used to enable the hysteretic mode control module 110, while the PWM mode enable signal PWM_ENABLE is used to enable the PWM mode control module 120.

In practice, this mode switching control operation is performed in such a manner that when (SW1, SW2)=(HIGH, LOW) or (LOW, HIGH), an instance of the hysteretic mode enable signal HT_ENABLE is outputted from the mode switching control module 220 for enabling the hysteretic mode control module 110; and when (SW1, SW2)=(LOW, LOW), an instance of the hysteretic mode enable signal HT_ENABLE is outputted for enabling the PWM mode control module 120.

During operation of the DC-DC converter 10, the dual-mode transient recovery control system of the invention 100 is also activated to control the DC-DC converter 10 for operating between hysteretic mode and PWM mode in response to the ripple voltage amplitude of $V_o$, with the purpose of allowing the DC-DC converter 10 to have the operating characteristic of fast transient recovery.

Referring to FIG. 4, assume that during the period when $I_o$ is at step-up load situation, $V_o$ exhibits a negative ripple in its waveform. In this case, when the ripple voltage amplitude of $V_o$ reaches down below the negative-ripple falling-edge threshold ($V_{th1-}$), i.e., ($V_o \leq V_{th1-}$), it will cause the control signal generation module 210 to output (SW1, SW2)=(HIGH, LOW), thus activating the mode switching control module 220 to output a hysteretic mode enable signal HT_ENABLE for enabling the hysteretic mode control module 110 while disabling the PWM mode control module 120.

This switching action causes the DC-DC converter 10 to operate in the hysteretic mode under control by the hysteretic mode control module 10.

Subsequently, when $V_o$ bounces back from the negative extreme and reaches at $V_{th1-}$, the control signal generation module 210 maintains the output state of (SW1, SW2)=(HIGH, LOW) and waits until $V_o$ further reaches up above the negative-ripple rising-edge threshold ($V_{th1+}$), i.e., ($V_o \geqq V_{th1+}$), to switch SW1 to logic-LOW state, i.e., (SW1, SW2)=(LOW, LOW). This output state of (SW1, SW2) activates the mode switching control module 220 to output a PWM mode enable signal PWM_ENABLE for enabling the PWM mode control module 120 while disabling the hysteretic mode control module 110. This switching action causes the DC-DC converter 10 to operate in the PWM mode under control by the PWM mode control module 120.

On the other hand, as shown in FIG. 4, assume that during the period when $I_o$ is at step-down load situation, $V_o$ exhibits a over-shoot in its waveform. In this case, when the ripple voltage amplitude of $V_o$ reaches up above the positive-ripple rising-edge threshold ($V_{th2+}$), i.e., ($V_o \geqq V_{th2+}$), it will cause the control signal generation module 210 to output (SW1, SW2)=(LOW, HIGH), thus activating the mode switching control module 220 to output a hysteretic mode enable signal HT_ENABLE for enabling the hysteretic mode control module 110 while disabling the PWM mode control module 120. This switching action causes the DC-DC converter 10 to operate in the hysteretic mode under control by the hysteretic mode control module 110.

Subsequently, when $V_o$ bounces back from the positive extreme and reaches at $V_{th2+}$, the control signal generation module 210 maintains the output state of (SW1, SW2)=(LOW, HIGH) and waits until $V_o$ further reaches down below the positive-ripple falling-edge threshold ($V_{th2-}$), i.e., ($V_o \leqq V_{th2-}$), to switch SW2 to logic-LOW state, i.e., (SW1, SW2)=(LOW, LOW). This output state of (SW1, SW2) activates the mode switching control module 220 to output a PWM mode enable signal PWM_ENABLE for enabling the PWM mode control module 120 while disabling the hysteretic mode control module 110. This switching action causes the DC-DC converter 10 to operate in the PWM mode under control by the PWM mode control module 120.

The above-described switching operations are repeatedly performed in response to the ripple voltage amplitude of $V_o$ for the DC-DC converter 10 to operate between the hysteretic mode and the PWM mode and thereby provide fast transient recovery.

The following is a comparison of the invention with the prior art of U.S. Pat. No. 6,621,256, "DC to DC converter method and circuitry" with reference to FIGS. 5A-5B.

Figure 5A:
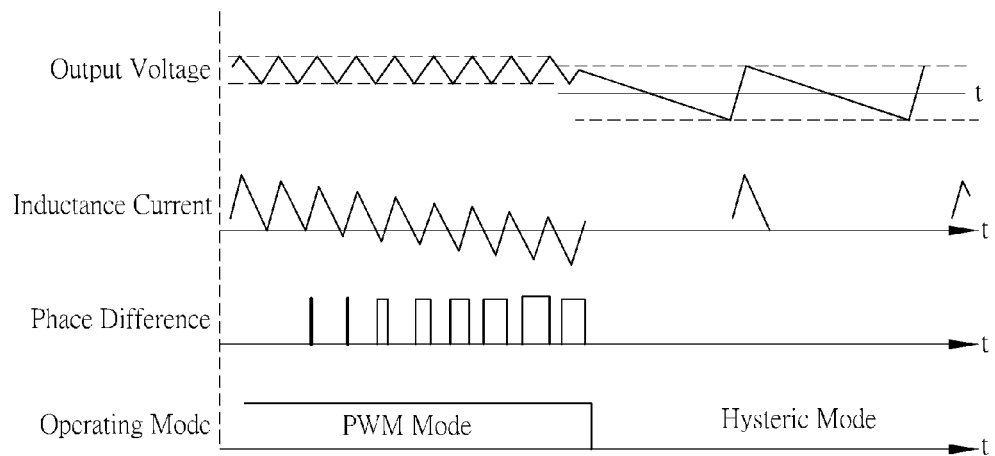
FIG. 5A (PRIOR ART) is a signal diagram used to explain one problem of using the prior art of U.S. Pat. No. 6,621,256.

Referring to FIG. 5A, the prior art of U.S. Pat. No. 6,621,256 teaches a dual-mode switching control method which switches the DC-DC converter to operate in PWM mode under the condition of a heavy loading, and to operate in hysteretic mode under the condition of a light loading. However, the switching operation would be influenced by an internal inductance current in such a manner that in PWM mode, it would exhibit a smaller ripple amplitude but a slower response; whereas in hysteretic mode, it would exhibit a faster response but a relatively larger ripple amplitude.

Figure 5B:
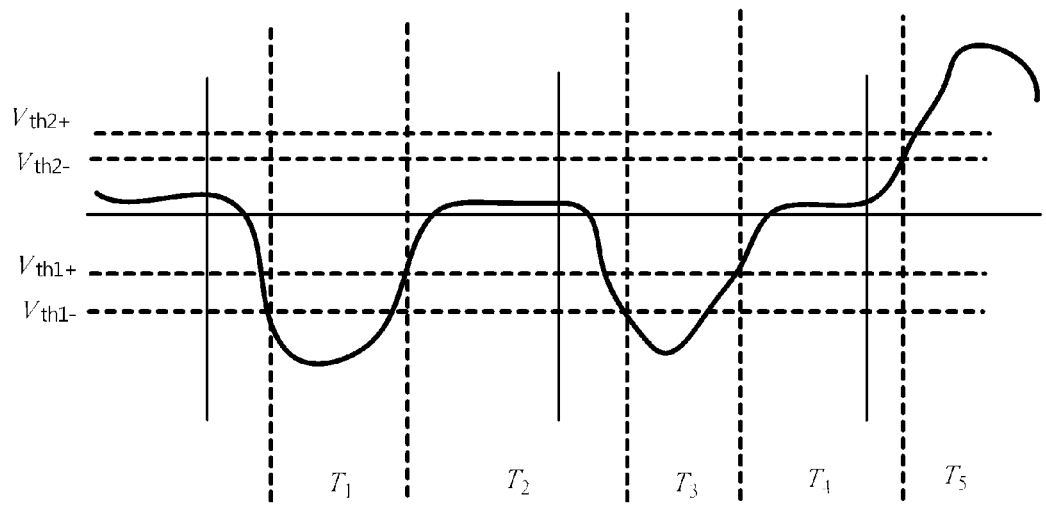
FIG. 5B is a signal diagram used to explain the advantage of the dual-threshold triggering method utilized by the invention over the prior art of U.S. Pat. No. 6,621,256.

In comparison, as depicted in FIG. 5B, owing to the use of a dual-threshold triggering method on both under-shoot and over-shoot of the DC-DC output voltage, the invention is capable of triggering the switching operation between hysteretic mode and PWM mode at two points in the ripple voltage amplitude on both under-shoot and over-shoot. This feature allows a fast transient recovery with small ripple amplitudes. The invention is therefore more advantageous to use than the prior art.

Moreover, the use of the dual-threshold triggering method on both under-shoot and over-shoot of the DC-DC output voltage can also be used to prevent a faulty triggering of the switching operation by noises. Therefore, the dual-threshold triggering method provides better noise immunity than the conventional single-threshold triggering method.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A dual mode transient recovery control method for integration to a direct-current (DC) power output unit and a load circuit, the method comprising:
   detecting a DC output voltage amplitude of the DC power output unit;
   comparing the detected DC output voltage amplitude against a set of preset threshold levels including a negative-ripple falling-edge threshold and a negative-ripple rising-edge threshold on the negative polarity of the DC output voltage amplitude, and a positive-ripple rising-edge threshold and a positive-ripple falling-edge threshold on the positive polarity of the DC output voltage amplitude;
   when the detected DC output voltage amplitude reaches down below the negative-ripple falling-edge threshold from steady state, performing a hysteretic mode control operation on the DC power output unit;
   when the detected DC output voltage amplitude reaches up above the negative-ripple rising-edge threshold after passing through the negative-ripple falling-edge threshold, performing a PWM (Pulse Width Modulation) mode control operation on the DC power output unit;
   when the detected DC output voltage amplitude reaches up above the positive-ripple rising-edge threshold from steady state, performing a PWM mode control operation on the DC power output unit; and
   when the detected DC voltage output amplitude reaches down below the positive-ripple falling-edge threshold after passing through the positive-ripple rising-edge threshold, performing a PWM mode control operation on the DC power output unit.

2. The dual mode transient recovery control method as recited in claim 1, wherein the DC power output unit is a DC-DC converter.

3. The dual mode transient recovery control method as recited in claim 2, wherein the DC-DC converter is a 0.8 V DC power output unit.

4. The dual mode transient recovery control method as recited in claim 1, wherein the negative-ripple rising-edge threshold is higher than the negative-ripple falling-edge threshold.

5. The dual mode transient recovery control method as recited in claim 1, wherein the positive-ripple falling-edge threshold is lower than the positive-ripple rising-edge threshold.

6. A dual mode transient recovery control system for integration to a DC power output unit and a load circuit, the system comprising:

a hysteretic mode control module that provides a hysteretic mode control function for the DC power output unit;

a pulse-width modulation (PWM) mode operating module, that provides a PWM mode control function for the DC power output unit;

a control signal generation module, that detects the DC output voltage amplitude of the DC power output unit for comparison based on a dual-threshold comparison method against a pair of preset threshold levels on each polarity of the DC output voltage amplitude, including a negative-ripple falling-edge threshold and a negative-ripple rising-edge threshold on the negative polarity of the DC output voltage amplitude, and a positive-ripple rising-edge threshold and a positive-ripple falling-edge threshold on the positive polarity of the DC output voltage amplitude, thereby generating a set of mode switching control signals; and a mode switching control module that responds to the mode switching control signals generated by the control signal generation module for switching between the hysteretic mode control module and the PWM mode control module.

7. The dual mode transient recovery control system as recited in claim 6, wherein the DC power output unit is a DC-DC converter.

8. The dual mode transient recovery control system as recited in claim 7, wherein the DC-DC converter is a 0.8 V DC power output unit.

9. The dual mode transient recovery control system as recited in claim 6, wherein the negative-ripple rising-edge threshold is higher than the negative-ripple falling-edge threshold.

10. The dual mode transient recovery control system as recited in claim 6, wherein the positive-ripple falling-edge threshold is lower than the positive-ripple rising-edge threshold.

11. A dual mode transient recovery control system for integration to a DC-DC converter and a load circuit, the system comprising:

a hysteretic mode control module that provides a hysteretic mode control function for the DC-DC converter;

a pulse-width modulation (PWM) mode operating module that provides a PWM mode control function for the DC-DC converter;

a control signal generation module that detects the DC output amplitude of the DC-DC converter for comparison based on a dual-threshold comparison method against a pair of preset threshold levels on both under-shoot and over-shoot of the DC output amplitude, including a negative-ripple falling-edge threshold and a negative-ripple rising-edge threshold on the negative polarity of the DC output voltage amplitude, and a positive-ripple rising-edge threshold and a positive-ripple falling-edge threshold on the positive polarity of the DC output voltage amplitude, to thereby generate a set of mode switching control signals; wherein the negative-ripple rising-edge threshold is higher than the negative-ripple falling-edge threshold, and the positive-ripple falling-edge threshold is lower than the positive-ripple rising-edge threshold; and a mode switching control module that responds to the mode switching control signals generated by the control signal generation module for switching between the hysteretic mode control module and the PWM mode control module.

12. The dual mode transient recovery control system as recited in claim 11, wherein the DC-DC converter is a 0.8 V DC power output unit.

13. The dual mode transient recovery control system as recited in claim 11, wherein the dual-threshold comparison method performed by the control signal generation module is implemented with analog comparator circuitry.

14. The dual mode transient recovery control system as recited in claim 11, wherein the dual-threshold comparison method performed by the control signal generation module is implemented with digital comparator circuitry.

15. A dual-mode switching control circuit for integration to a load circuit and a direct-current (DC) power output unit equipped with a hysteretic mode of operation and a PWM (Pulse Width Modulation) mode of operation, the dual-mode switching control circuit comprising:

a control signal generation module that detects the DC output voltage amplitude of the DC power output unit for comparison based on a dual-threshold comparison method against a pair of preset threshold levels on each polarity of the DC output voltage amplitude, including a negative-ripple falling-edge threshold and a negative-ripple rising-edge threshold on the negative polarity of the DC output voltage amplitude, and a positive-ripple rising-edge threshold and a positive-ripple falling-edge threshold on the positive polarity of the DC output voltage amplitude, to thereby generate a set of mode switching control signals; and a mode switching control module that responds to the mode switching control signals generated by the control signal generation module for switching between the hysteretic mode of operation and the PWM mode of operation for the DC power output unit.

16. The dual mode transient recovery control system as recited in claim 15, wherein the DC power output unit is a DC-DC converter.

17. The dual mode transient recovery control system as recited in claim 16, wherein the DC-DC converter is a 0.8 V DC power output unit.

18. The dual mode transient recovery control system as recited in claim 15, wherein the negative-ripple rising-edge threshold is higher than the negative-ripple falling-edge threshold.

19. The dual mode transient recovery control system as recited in claim 15, wherein the positive-ripple falling-edge threshold is lower than the positive-ripple rising-edge threshold.

* * * * *